United States Patent [19]

Hurlburt et al.

[11] 4,046,866
[45] Sept. 6, 1977

[54] PRODUCTION OF LIQUID SULFUR TRIOXIDE

[75] Inventors: Harvey Zeh Hurlburt, Houston, Tex.; Clark A. Sumner, Santa Ana, Calif.

[73] Assignee: Stauffer Chemical Company, Westport, Conn.

[21] Appl. No.: 571,136

[22] Filed: Apr. 24, 1975

[51] Int. Cl.$^2$ .................... C01B 17/50; C01B 17/76
[52] U.S. Cl. ................................ 423/533; 423/522; 423/543
[58] Field of Search .............. 423/522, 532–539, 423/543

[56] References Cited
U.S. PATENT DOCUMENTS

| | | | |
|---|---|---|---|
| 1,520,093 | 12/1924 | Shapleigh | 423/523 |
| 2,510,684 | 6/1950 | Cathala | 423/536 |
| 2,879,135 | 3/1959 | Haltmeier | 423/522 |
| 3,455,652 | 7/1969 | James | 423/536 |
| 3,755,549 | 8/1973 | Guth | 423/533 |
| 3,803,297 | 4/1974 | Guth et al. | 423/533 X |
| 3,907,979 | 9/1975 | Jenniges | 423/533 X |

FOREIGN PATENT DOCUMENTS

| | | | |
|---|---|---|---|
| 1,767,587 | 9/1971 | Germany | 423/522 |
| 194,879 | 6/1906 | Germany | 423/532 |
| 504,635 | 6/1925 | Germany | 423/533 |
| 47-15447 | 9/1972 | Japan | 423/543 |

*Primary Examiner*—O. R. Vertiz
*Assistant Examiner*—Gary P. Straub
*Attorney, Agent, or Firm*—Joel G. Ackerman

[57] ABSTRACT

A process for production of liquid sulfur trioxide in which sulfur is combusted with oxygen in one stage at a furnace outlet temperature of between about 1000° F and about 2700° F, and the resulting sulfur dioxide-containing gas is subjected to multistage catalytic conversion to sulfur trioxide, the sulfur trioxide being recovered by conventional condensaton techniques. Substantially all the uncondensed gases from the sulfur trioxide condensation step are recycled to the combustion step.

9 Claims, 1 Drawing Figure

PRODUCTION OF LIQUID SULFUR TRIOXIDE

BACKGROUND AND PRIOR ART

Sulfur trioxide is generally commercially produced from sulfur-containing substances such as free sulfur, hydrogen sulfide, sludge acid, pyrites, and other materials, by combusting these in the presence of air or oxygen to produce a gas containing predominantly sulfur dioxide. The sulfur dioxide is then subjected to several stages of catalytic conversion, usually utilizing a platinum or vanadium catalyst, to produce a gas containing sulfur trioxide. Sulfur trioxide is then recovered either by absorption with sulfuric acid to produce oleum or by absorption of a portion of the sulfur trioxide with sulfuric acid, and condensing the remainder of the sulfur trioxide in a cooled condensation apparatus to produce sulfur trioxide in liquid form. It has also been found that the production of sulfur trioxide is enhanced by conducting the process at elevated pressures, generally 3 atmospheres and above.

For example, U.S. Pat. No. 3,803,297 to Guth et al. discloses the production of sulfur trioxide by combustion of sulfur with oxygen in at least two stages, each of which is preferably subdivided into sub-stages, followed by the cooling of the combustion gases, catalytic conversion of the gases to sulfur trioxide and recovery of sulfur trioxide by absorption with sulfuric acid to produce oleum. The temperature in the combustion stages is controlled by (a) utilizing less than a stoichiometric amount of oxygen and (b) passing some of the feed oxygen through the sulfuric acid absorption stage to pick up some sulfur trioxide, thereby recycling this sulfur trioxide to the combustion stage to act as a heat sink (the decomposition of sulfur trioxide is an endothermic reaction). The patent requires a careful control of combustion by dividing it into two main stages, with from about 5-40% of the sulfur being combusted in the first stage together with at most a stoichiometric amount of oxygen, and recycled sulfur trioxide, and the remaining 50-95% sulfur being oxidized in a second stage using a stoichiometric amount of oxygen. The second stage is additionally divided into a series of substages for better control of the operating temperature. Some sulfur trioxide is also introduced into the gases entering the sulfur dioxide catalytic conversion steps.

Another such process is disclosed in U.S. Pat. No. 3,455,652 of James. A sulfur-containing feed is combusted with air or oxygen-enriched air, the oxygen being present in excess, the sulfur dioxide being converted to sulfur trioxide in a conventional catalytic conversion step or steps, and the sulfur trioxide being recovered by condensation of one portion and absorption of the remaining portion with sulfuric acid to produce oleum. The process is conducted at elevated pressures, between 3 and 50 kg/cm².

It is known, for example, from U.S. Pat. No. 3,803,297, that the combustion of sulfur with stoichiometric amounts of pure oxygen results in extremely high temperatures in the combustion furnace (about 3000° C absent the use of cooling means). This temperature can be lowered to below 1200° C, as in U.S. Pat. No. 3,455,652, by conducting the combustion with air or oxygen-enriched air. The drop in temperature, however, is more than offset by the dilution of process gases with large volumes of inert gases, particularly nitrogen, which requires large equipment and higher utilities for processing the overall gas streams, and large-scale constant venting with pollutant removal to prevent buildup of inerts in the system.

It is an object of the present invention to provide an improved process for the production of liquid sulfur trioxide.

It is a further object of the present invention to provide an improved process for the production of liquid sulfur trioxide at elevated pressures.

It is a further object of the present invention to provide a process for the production of liquid sulfur trioxide with relatively low temperatures in the sulfur combustion zone.

It is another object of the present invention to provide a process for the production of liquid sulfur trioxide without requiring the necessity of elaborate equipment or processing steps in the combustion zone.

It is also an object of the present invention to provide a process for the production of liquid sulfur trioxide having a combustion stage which operates at a low temperature and with conventional equipment, without the necessity of recycling large quantities of inert gases.

Another object of the present invention is to provide such a process which permits the use of elemental oxygen as the combustion gas.

Still another object of the present invention is to provide a process for the production of sulfur trioxide which facilitates recovery of the desired product.

Another object of the present invention is to provide a process for the production of liquid sulfur trioxide without the concomitant production of oleum or sulfuric acid.

Yet another object of this invention is to provide a process for the production of liquid sulfur trioxide in which potential pollution sources are minimized.

SUMMARY OF THE INVENTION

The present invention comprises a process for the production of liquid sulfur trioxide at elevated pressure comprising:

a. combusting sulfur with oxygen in a singlestage combustion step at an outlet temperature of between about 1000° F and about 2700° F in the presence of from about 2 to about 6 moles of recycled sulfur trioxide containing process gas per mole of sulfur, to produce a gaseous effluent containing sulfur dioxide;

b. contacting the gaseous effluent from step (a) with a catalyst whereby sulfur dioxide is converted to sulfur trioxide, said conversion being performed in at least two stages in series, the products of each conversion stage being cooled between the stages;

c. cooling the effluent from step (b) to produce a liquid product comprising a first portion of the sulfur trioxide in the effluent and a gaseous product comprising the remainder of the sulfur trioxide in the effluent;

d. separating the liquid and gaseous products of step (c);

e. recovering a liquid sulfur trioxide product from the liquid product of step (c); and f. recycling to step (a) substantially all the gaseous product of step (c).

DETAILED DESCRIPTION OF THE INVENTION

Figure 1:
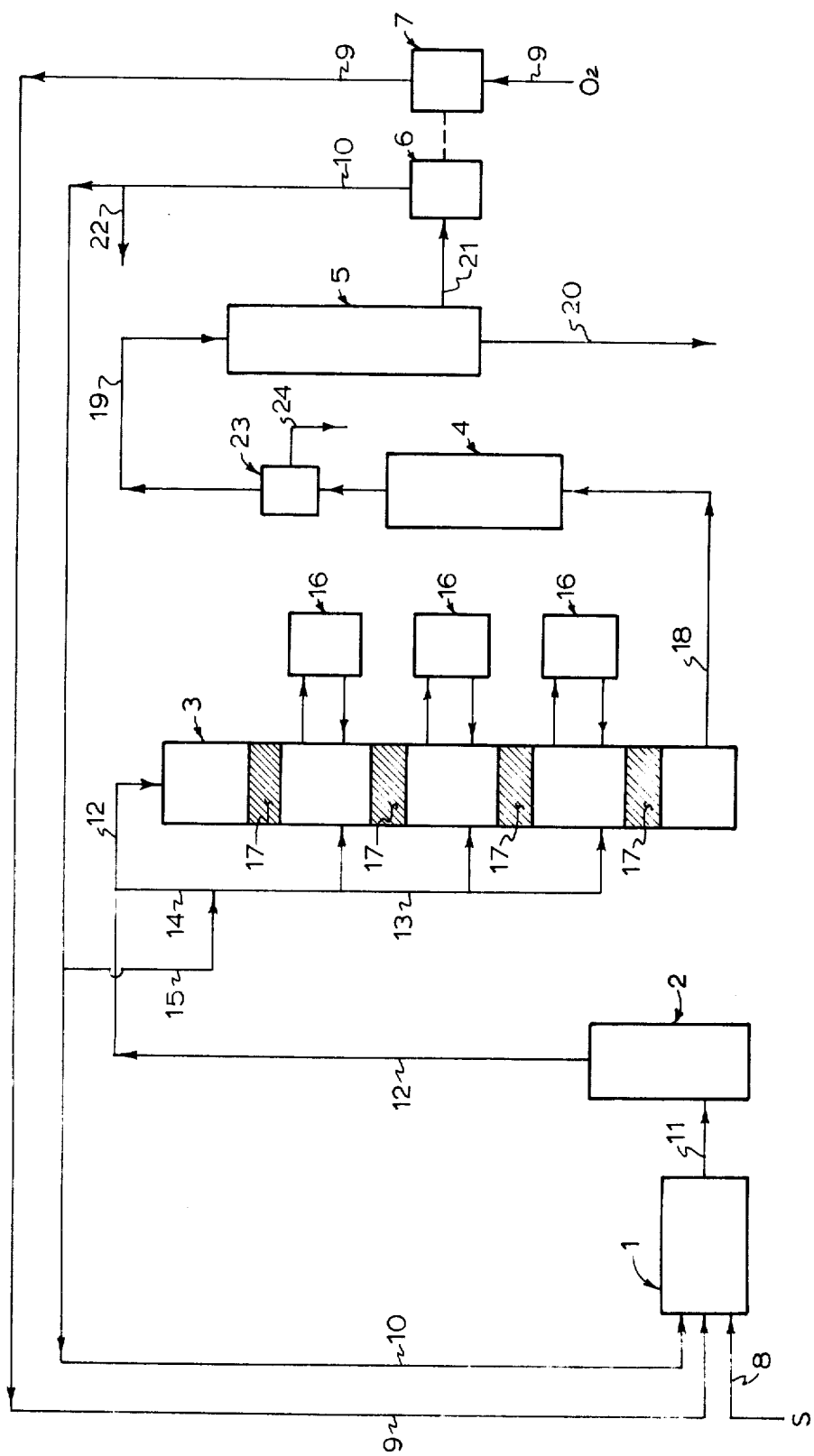

The invention is more clearly described with reference to the Figure, which shows a typical flow sheet for conducting the process.

Referring to the Figure, sulfur in line 8, oxygen in line 9 and recycled process gases in line 10 (as hereinafer described) are introduced into combustion furnace 1. Preferably, relatively pure oxygen and sulfur are used in order to minimize the amount of impurities contained in the resulting process gas; the oxygen feed will preferably contain about 0.5% nitrogen. However, the nitrogen content of the oxygen may be higher, up to about 10%. Variations in the nitrogen content of the oxygen feed can be compensated for by varying the amount of gas vented from the system as hereinafter described.

The sulfur is preferably as pure as possible. However, depending on its source, it may contain small amounts of impurities such as dissolved $H_2S$, inorganic ash and/or traces of hydrocarbons. During combustion, these will be converted to $SO_2$, $CO_2$ and water. $CO_2$ can be removed by a small increase in the rate or amount of venting gas from the system, as hereinafter described.

The combustion furnace is operated at an outlet temperature of between about 1000° F and about 2700° F, preferably between about 1250° F and about 1800° F, as contrasted with the process of Guth et al., in which the combustion takes place at about 2000° C.

The hot combustion gases, consisting primarily of sulfur dioxide and unconverted sulfur trioxide and oxygen, together with minor amounts of impurities, are cooled in heat exchanger 2, which may be a waste heat boiler or the like, to a temperature sufficiently high to permit catalytic activity to occur in the catalyst beds, generally between about 650° F and 1000° F, preferably between about 750° F and 850° F. The gases from heat exchanger 2, generally containing greater than 15% sulfur dioxide by volume, preferably 25% to 45%, are introduced into catalytic converter 3. In the converter are located two or more beds 17 containing conventional vanadium oxide or platinum catalysts. Additionally, between each catalyst bed is a cooling means 16 which may be a steam boiler, cooling coil, heat exchanger, or the like. In one embodiment, a portion of the combustion effluent gas is bypassed via the lines 14 and 13 and injected into the process gas stream at one or more points between catalyst beds 17 to enhance the cooling effect of cooling means 16. Amounts of recycled gases, as defined hereinafter, may be introduced into the bypass line 14 through line 15 if desired to assist in the cooling effect. Alternatively, all the gas to be processed can be introduced into the top of the bed through line 12 and only recycled gas is introduced between the beds for cooling effect, or the interstage cooling can be performed solely by cooling means 16. Typical temperatures at the exit of the various catalyst zones will be about 900° F to about 1150° F, depending on the feed gas composition.

The gases leaving the catalytic converter are conducted through line 18 to a heat exchanger 4, which is preferably a feedwater heater or economizer, in which they are cooled to a temperatue of between about 250° F and 400° F, preferably between about 300° F and about 350° F, and are then passed via line 19 into condenser 5, which is operated according to conventional techniques for production of a liquid sulfur trioxide product which is recovered through line 20. The condensation operation is generally conducted at temperatures from about 100° F to about 160° F, preferably about 125° F. The sulfur trioxide product will contain a small amount of dissolved sulfur dioxide, generally from about 1% to about 4% by weight, the amount being governed by the partial pressure of the two sulfur oxides in the gas stream entering the condenser in line 19. Uncondensed gases are removed from the condenser in line 22 and are recycled to the combustion furnace 1 via line 10.

If water is present in the process gas (e.g., resulting from oxidation of $H_2S$ contained in the feed sulfur), the gases in line 19 are first passed through a mist filter 23, or other suitable apparatus, for removal of water and sulfuric acid to aovid product contamination. These are recovered in line 24 and disposed of in a conventional manner.

The process gas recycled through line 10 will consist primarily of sulfur trioxide, nitrogen, oxygen and some sulfur dioxide and may also contain small amounts of impurities such as carbon dioxide, which result from oxidation of impurities in the sulfur and/or oxygen. The content of nitrogen and the said impurities in the system can be controlled by purging small amounts of uncondensed gas through line 22. The rate of venting depends upon the level of the nitrogen and other impurities. In a preferred embodiment, the nitrogen content of the gases removed from the condenser through line 21 is maintained at between 20% and 40%. Under these conditions, about ½ to 1 percent of the process gas recycled in line 10 will be vented. The gas in line 22 is treated as necessary before venting, by scrubbing or otherwise, to remove sulfur compounds and/or other pollutants which may be contained therein.

Commercial oxygen is normally available at elevated pressure. It is necessary to pass the oxygen through a turbine or other pressure reducing equipment down to process pressure and, in a preferred embodiment, sufficient useful work is produced solely by the expansion of oxygen in turbine 7 to drive the process gas recycle blower 6. Since the entire process system is operated under pressure, the process gas blower 6 need only overcome the pressure drop throughout the system and therefore no great amount of work is required. With proper design, the pressure drop can be reduced to a relatively small fraction of the total system pressure, thus keeping power requirements at a minimum. The process gas blower discharge pressure is typically 8-12 psi above the inlet pressure, depending on the pressure drop. On the other hand, if gaseous oxygen is supplied at low pressure, it must be compressed by an auxiliary compressor to process pressure levels. In such a case, the process gas blower 6 will be driven by other means. Additionally, the introduction of oxygen at a low temperature assists in maintaining the temperature of combustion stage 1 at a reasonable level. If cold oxygen is not available, the process gas recycle rate will be increased to compensate for this decrease in the cooling effect.

If high purity sulfur trixode is desired, the sulfur dioxide contained in the sulfur trioxide removed via line 20 can be removed through conventional rectification or distillation steps.

The overall process is run at elevated pressure; in general, the pressure will be greater than 2 atmospheres, preferably between about 50 and about 100 psig. The pressure drop is maintained at a value between about 1 and about 20 psi, preferably about 8-12 psi.

The temperature and pressure under which sulfur trioxide is condensed are related to each other as is known in the art; their relationship depends upon the concentration of sulfur trioxide and its partial pressure at the condense inlet. The condenser is operated at temperatures ranging from 100°-160° F, preferably 125°-140° F and at pressure levels which permit condensation to be effected using ordinary cooling water at ambient temperature or above in order to avoid the possibility of freezing of the sulfur trioxide. The condensation equipment is that which is conventionally used and may be a standard shell and tube condenser or any other type which is suitable.

The table which follows shows some typical process conditions for a plant producting 200 tons per day of liquid sulfur trioxide.

TABLE

|  | Run No. | | | |
| --- | --- | --- | --- | --- |
|  | 1 | 2 | 3 | 4 |
| Furnace Temp. ° F | 1581 | 2096 | 1701 | 2399 |
| Condenser Temp. ° F | 150 | 140 | 137 | 125 |
| Condenser Pressure, psig | 100 | 100 | 75 | 75 |
| Flow Rates, lb. mols/hr: | | | | |
| Furnace Exit | 1564.6 | 1086.1 | 1374.6 | 964.2 |
| Vent Gas | 5.1 | 4.6 | 6.6 | 5.9 |
| Recycle Gas | 1201.8 | 696.3 | 991.6 | 583.1 |
| Composition, Converter Feed, mol %: | | | | |
| $SO_2$ | 27.68 | 40.28 | 32.70 | 44.62 |
| $O_2$ | 27.45 | 32.75 | 35.72 | 36.85 |
| Composition, Converter Feed, mol %: (cont.) | | | | |
| $N_2$ | 24.49 | 22.70 | 17.61 | 16.62 |
| $SO_3$ | 20.38 | 4.27 | 13.97 | 1.91 |
| Composition, Recycle Gas, mol %: | | | | |
| $SO_2$ | 11.43 | 12.46 | 11.73 | 17.01 |
| $O_2$ | 23.51 | 26.05 | 32.74 | 32.64 |
| $N_2$ | 31.75 | 35.17 | 24.25 | 27.20 |
| $SO_3$ | 33.31 | 26.32 | 31.28 | 23.15 |
| Feed Rate, mols/hr: | | | | |
| Sulfur | 214.4 | 213.9 | 215.0 | 214.5 |
| Oxygen (100% basis)* | 320.5 | 319.7 | 322.3 | 321.1 |
| Mols Recycle/mol S Fed | 5.6 | 3.3 | 4.6 | 2.7 |
| % of $SO_3$ in Condenser Inlet Gas Condensed | 34.1 | 53.0 | 40.0 | 60.4 |

*Feed oxygen contained 0.5% $N_2$

The amount of gas available for recycling will thus depend on the condenser conditions and concentration and partial pressure of sulfur trioxide in the gas entering the condenser. Generally, the condensation is conducted so that between about 20% and about 70%, preferably between about 30% and about 45%, of the sulfur trioxide in line 19 is condensed and recovered as product, per pass. Preferably, the ratio of recycled process gas to fresh feed sulfur is from about 2 to about 6 moles per mole of sulfur. The composition of the recycled gases will normally vary somewhat. However, by recycling substantially all the uncondensed process gases (except that which is vented from the system through line 22), it has been found possible to operate the combustion zone 1 at lower temperatures than in the Guth et al. process for example, and to conduct combustion in one stage without requiring the use of complicated and expensive combustion equipment, and without the problem of dealing with large volumes of inert gas in the system, as in the James process.

In a preferred embodiment, the recycled process gases also contain substantial amounts of sulfur dioxide, generally greater than 10 mol %. In the practice of the present process, it is unnecessary to effect a complete conversion of all sulfur dioxide in the catalytic converter fed to sulfur trioxide. In fact, to do so may be less advantageous as the partial pressure of sulfur trioxide in the gases entering the condenser will then be high; a greater amount of sulfur trioxide will condense out, thus making less gas available for recycle. As can be seen from the Table, the quantities of process gas recycled, and the corresponding flow rates, can be substantially varied while still accomplishing the result of the invention. For instance, in Run No. 1, the flow rate of recycled process gases is more than 50% greater than that of Run No. 4, thus permitting furnace operation at substantially lower temperatues; nevertheless, the overall production (200 tons/day) is not affected.

An additional advantage of the present process is that, since large quantities of sulfur oxide-containing gases are not discharged to the atmosphere, pollution problems are minimized and costly sulfur-recovery equipment is not required.

Certain modifications, equivalents and variations of the present process will no doubt be apparent to those skilled in the art. The invention, therefore, is not considered to be limited by the foregoing description, but only by the claims which follow.

What is claimed is:

1. In an oxygen-based process for the production of liquid sulfur trioxide at elevated pressure by combustion of sulfur with elemental oxygen, followed by catalytic conversion of the resulting sulfur dioxide to sulfur trioxide in at least two stages, recovering a portion of the sulfur trioxide by condensation of the gaseous product of the catalytic conversion and recycling of sulfur trioxide-containing gases to the combustion step, the improvement whereby sulfur trioxide is prepared without concomitant production of sulfuric acid or oleum comprising: conducting the combustion in a single stage, in the presence of from about 2 to about 6 moles of recycled gas per mole of sulfur at an outlet temperature of between about 1250° F. and 1800° F., condensing between about 20% and about 70% of the sulfur trioxide in the gaseous product of the catalytic conversion and recycling substantially all the uncondensed gases exiting from the sulfur trioxide condenser to the combustion step.

2. A process according to claim 1 in which the pressure is between about 50 and about 100 psig.

3. A process according to claim 1 in which between about 30% and about 45% of the sulfur trioxide in the gaseous product of the catalytic conversion is condensed.

4. A process according to claim 1 in which a minor portion of the uncondensed gases exiting from the sulfur trioxide condenser is vented prior to recycling to the combustion step.

5. A process according to claim 1 in which the sulfur trioxide condensation is conducted at a temperature of from about 100° F. to about 160° F.

6. A process according to claim 5 in which the condensation is conducted at a temperature of from about 125° F. to about 140° F.

7. A process according to claim 1 in which the gaseous product of the catalytic conversion is cooled to a temperature of between about 250° F. and about 400° F. prior to the introduction into the condenser.

8. A process according to claim 1 in which the sulfur dioxide contact of the combustion product gases is between about 25% and about 45% by volume.

9. A process according to claim 1 in which the gases exiting the sulfur trioxide condenser contain between about 10% and about 17% by volume of sulfur dioxide.

* * * * *